UNITED STATES PATENT OFFICE.

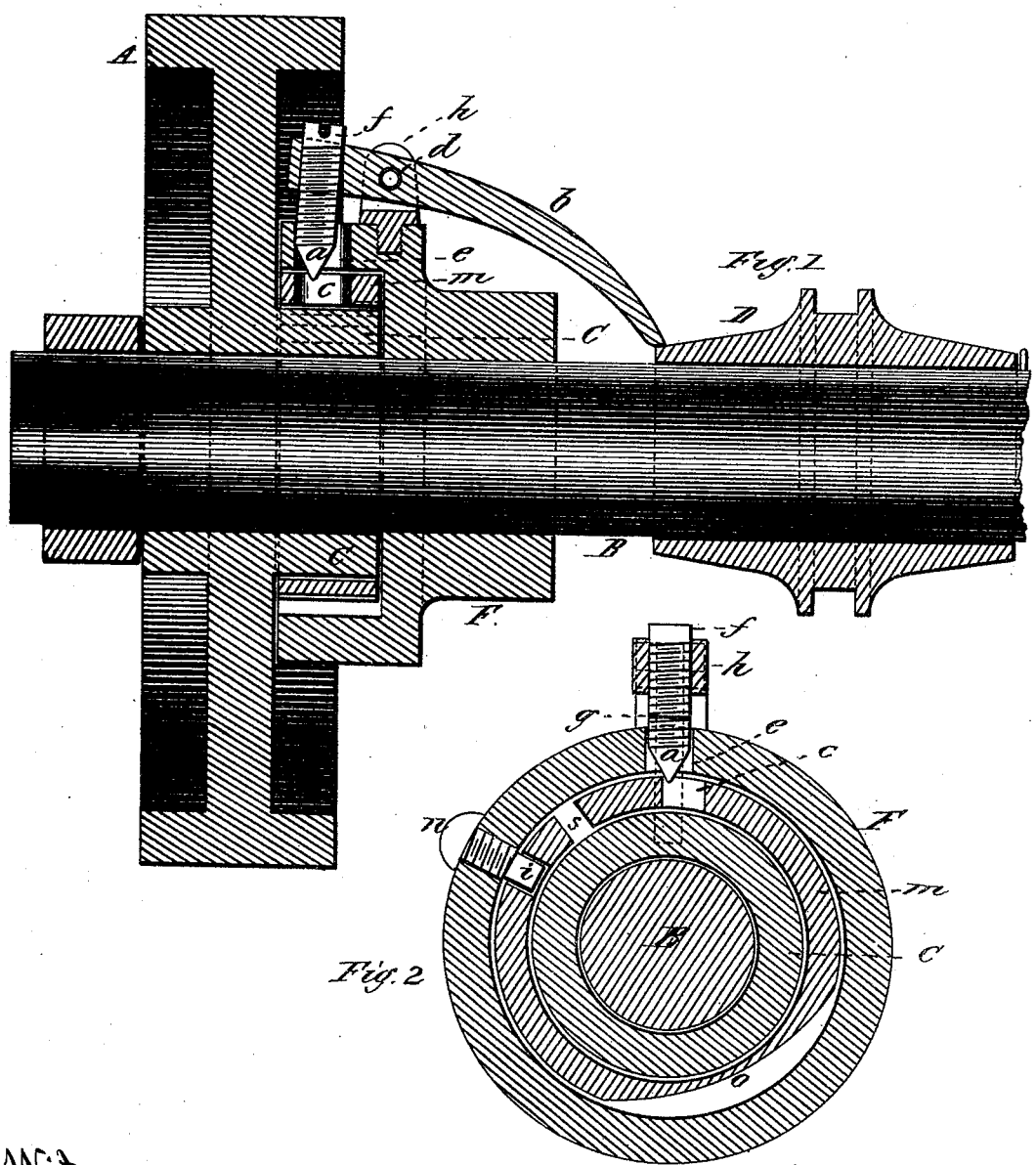

CHARLES E. BURWELL AND FRANK G. BATES, OF SPRINGFIELD, MASS.

IMPROVEMENT IN FRICTION-CLUTCHES.

Specification forming part of Letters Patent No. 157,063, dated November 24, 1874; application filed January 20, 1874.

*To all whom it may concern:*

Be it known that we, CHARLES E. BURWELL and FRANK G. BATES, of Springfield, State of Massachusetts, have invented a new and useful Improved Friction-Pulley; and we do hereby declare that the following is a full, clear, and exact description thereof, reference being had to the accompanying drawings, making a part of this specification, and to the letters of reference marked thereon, in which—

Figure 1 is a vertical central section through the pulley and friction mechanism, showing its application to a shaft; and Fig. 2 is a transverse section on the line of the axis of the wedge or cone.

Our invention relates to a friction-pulley in which the friction is applied to the hub to hold the pulley; and it consists of a false hub fixed to a shaft, having a recess in which is a spring-ring nearly encircling the hub of a loose pulley. A lever is pivoted to the false hub or to a stud fixed thereto, and into a threaded hole in one end of the lever is turned a screw, made conical at the end, and passing through a hole in the false hub, is made to impinge against the side of a cavity or hole in the spring-ring by moving the long arm of the pivoted lever outward from the shaft, and throwing one end of the spring-ring around a little, while the other end of the said ring is held stationary by a stud or screw in the false hub, thus changing or reducing the diameter of the spring-ring, the object of the invention being to apply the friction all around the hub of the pulley, or as nearly so as possible.

In the drawings, B represents a shaft upon which is a loose pulley, A, with its hub C within a recess in the false hub F, secured firmly to the shaft, the spring-ring $m$ being also in the recess in said false hub, and nearly encircling the hub C of the pulley. Said ring $m$ has its ends a little distance apart, as shown at $s$, and is held in place by a smooth stud, $i$, extending through the hub F into a hole in one end of the ring $m$, and the other end of the ring is provided with a hole, $c$. The false hub F is also provided with a hole, $e$, the axis of which is a little to one side of the axis of the hole $c$, and to the false hub is fixed a stud, $h$, in which is pivoted a lever, $b$, having a threaded hole made in the short arm, through which is turned a screw, $f$, the lower end of which is made conical, as shown at $a$, and which protrudes into the hole $e$ of the false hub, as shown clearly in Fig. 2.

The ring $m$ may be made thin at one or more places, $o$, to cause it to spring more readily, and a conical collar, D, slides to and fro on the shaft beneath or inside the long arm of the pivoted lever $b$, and operates to move the lever upon its fulcrum $d$, and as the long arm of the lever is moved by the collar D out from the shaft B the conical end $a$ of the screw or pin $f$ is forced in against the side $x$ of the hole $c$ in the spring-ring $m$. This forces that end of the ring toward its other end, or closes the ends together a little at $s$, one end of the ring being held from moving by the pin $i$, practically making the ring smaller in diameter as long as the conical end of the pin $f$ is held in against the side of the hole $c$. This reduction in the size of the ring causes it to clasp tightly around the hub C of the pulley, and causes it to revolve with the false hub F; but when the collar D is moved back into the position shown in Fig. 1 the pin $f$ is withdrawn and the ring $m$ springs out to its original size and releases its hold upon the hub of the pulley, which then becomes a loose pulley upon the shaft.

As shown in Fig. 1, the holes $e$ and $c$ in the hub F and ring $m$ are made larger than the pin $f$ to allow for the swing of the lever; but, in practice, I should divide the pin $f$ at the line $g$, making a short conical pin, $a$, with the holes $e$ made of a size for the pin $a$ to fit nicely, but to slide freely therein, and make the inner end of the screw $f$ somewhat rounded or pointed to move freely against the outer end of the short pin $a$.

We are aware that friction has been applied to the hub of a pulley heretofore, but a shoe was used which only partially surrounded the hub. In this device we apply the friction all around the hub, and by this combination of the wedge or cone and lever this friction is applied with great power.

The screw or pin $f$ may be adjusted either in or out by turning it in or out through the short arm of the lever $b$.

We are aware that friction-pulleys have heretofore been made and used in which a spring-ring was arranged to be applied to the rim of the pulley inside by opening the said ring; but we do not claim the same, nor any part thereof, as the object of our invention is to apply the friction to the hub of the pulley, as the velocity of the hub is much less than that of the rim, and the friction acts much quicker and the wear is less than when applied to the rim.

Having thus described our invention, what we claim as new is—

1. The spring-ring $m$, applied around the hub of a pulley, in combination with the pin $i$, as a means of communicating the friction or driving power to the hub, substantially as described.

2. The combination of the lever $b$, conical adjustable pin $f$, spring-ring $m$, and false hub F, substantially as described.

CHARLES E. BURWELL.
FRANK G. BATES.

Witnesses:
C. E. BUCKLAND,
JNO. D. PATTEN.